US012456359B2

(12) United States Patent
Hagen

(10) Patent No.: US 12,456,359 B2
(45) Date of Patent: Oct. 28, 2025

(54) CHILDREN AT PLAY LIVE INDICATOR

(71) Applicant: T-MOBILE INNOVATIONS LLC, Overland Park, KS (US)

(72) Inventor: Ryan Joseph Hagen, Kenmore, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 45 days.

(21) Appl. No.: 18/220,005

(22) Filed: Jul. 10, 2023

(65) Prior Publication Data

US 2025/0022358 A1 Jan. 16, 2025

(51) Int. Cl.
*G08B 23/00* (2006.01)
*G08B 7/06* (2006.01)
*G08B 21/02* (2006.01)

(52) U.S. Cl.
CPC ........... *G08B 21/0266* (2013.01); *G08B 7/06* (2013.01)

(58) Field of Classification Search
CPC .............................. G08B 21/0266; G08B 7/06
USPC ....................................................... 340/573.1
See application file for complete search history.

(56) References Cited

U.S. PATENT DOCUMENTS 11,062,583 B1 * 7/2021 Sathaye ............. G08B 21/0233
2003/0005135 A1 * 1/2003 Inoue ................. H04N 21/2541 348/E7.071
2003/0220835 A1 * 11/2003 Barnes, Jr. ............. G06Q 10/02 379/93.12
2010/0262367 A1 * 10/2010 Riggins ................ G08B 25/016 455/500

FOREIGN PATENT DOCUMENTS

JP 2024180641 A1 * 9/2004
JP 2006127184 A * 5/2006

* cited by examiner

*Primary Examiner* — Tai T Nguyen
(74) *Attorney, Agent, or Firm* — SHOOK, HARDY & BACON L.L.P.

(57) ABSTRACT

Methods and systems are provided for providing a children at play live indicator. A user device corresponding to a user is initially registered with a safety device. When the user device is within a configurable range of the safety device, an indication is received. A parent may configure the configurable range at a children at play service via a parent device. Based on the user device being within the configurable range of the safety device, the safety device emits a visual or audible indicator. Additionally or alternatively, a warning indicating the user device is within the configurable range of the safety device may be communicated to the user device, the parent device, or a connected vehicle approaching the safety device.

11 Claims, 3 Drawing Sheets

CHILDREN AT PLAY LIVE INDICATOR

SUMMARY

A high-level overview of various aspects of the invention are provided here for that reason, to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter.

In brief and at a high level, aspects are provided for providing a children at play live indicator. A user device corresponding to a user is initially registered with a safety device. When the user device is within a configurable range of the safety device, an indication is received. A parent may configure the configurable range at a children at play service via a parent device. Based on the user device being within the configurable range of the safety device, the safety device emits a visual or audible indicator. Additionally or alternatively, a warning indicating the user device is within the configurable range of the safety device may be communicated to the user device, the parent device, or a connected vehicle approaching the safety device.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
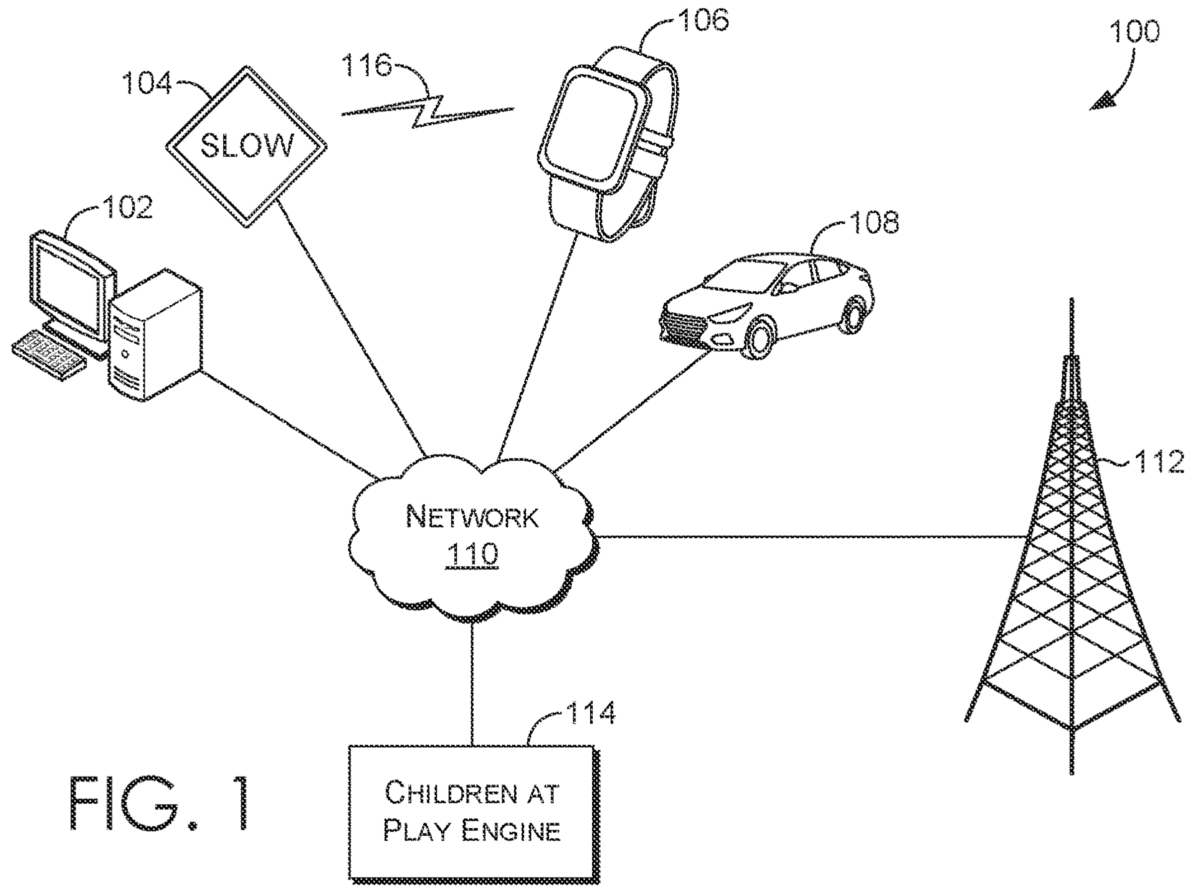
FIG. 1 depicts an example of a network environment in accordance with one or more embodiments.

The subject matter of select embodiments of aspects herein is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media includes media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" can be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program modules, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which can be used to store the desired information and which may be accessed by the computing device 500 shown in FIG. 5. Computer storage media does not comprise a signal per se.

"Communication media" may include, without limitation, computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more UE. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (i.e., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter.

The terms "user equipment," "UE," and "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies, current UE capable of using 5G and lacking backward compatibility with prior access technologies, and legacy UE that is not capable of using 5G.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such.

Aspects herein provide a children at play live indicator. A user device corresponding to a user is initially registered with a safety device. When the user device is within a configurable range of the safety device, an indication is received. A parent may configure the configurable range at a children at play service via a parent device. Based on the user device being within the configurable range of the safety device, the safety device emits a visual or audible indicator. Additionally or alternatively, a warning indicating the user device is within the configurable range of the safety device may be communicated to the user device, the parent device, or a connected vehicle approaching the safety device.

In one aspect, computer-readable storage media having computer-executable instructions embodied thereon is provided that, when executed by one or more processors, cause the processors to perform a method. The method comprises registering, at a children at play service, a user device corresponding to a user with a safety device. The method also comprises receiving an indication the user device is within a configurable range of the safety device. The method further comprises, based on the user device being within the configurable range of the safety device, causing the safety device to emit a visual or audible indicator.

In another aspect, a method for providing a children at play live indicator is provided. The method includes receiving at a safety device, a pairing request from a user device corresponding to a user. The method also comprises pairing the user device with the safety device. The method further comprises, based on the user device being within a configurable range of the safety device, emitting a visual or audible indicator at the safety device.

In yet another aspect, a system for providing a children at play live indicator is provided. The system comprises a user device corresponding to a user registered at a children at play service. The system also comprises the children at play service that stores information corresponding to a safety device and the user device and enables a parent to configure a configurable range for the user device and the safety device. The system further comprises the safety device that, based on the user device being within the configurable range of the safety device, emits a visual or audible indicator.

Turning to FIG. 1, a network environment suitable for use in implementing embodiments of the present disclosure is provided. Such a network environment is illustrated and designated generally as network environment 100. Network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

Figure 5:
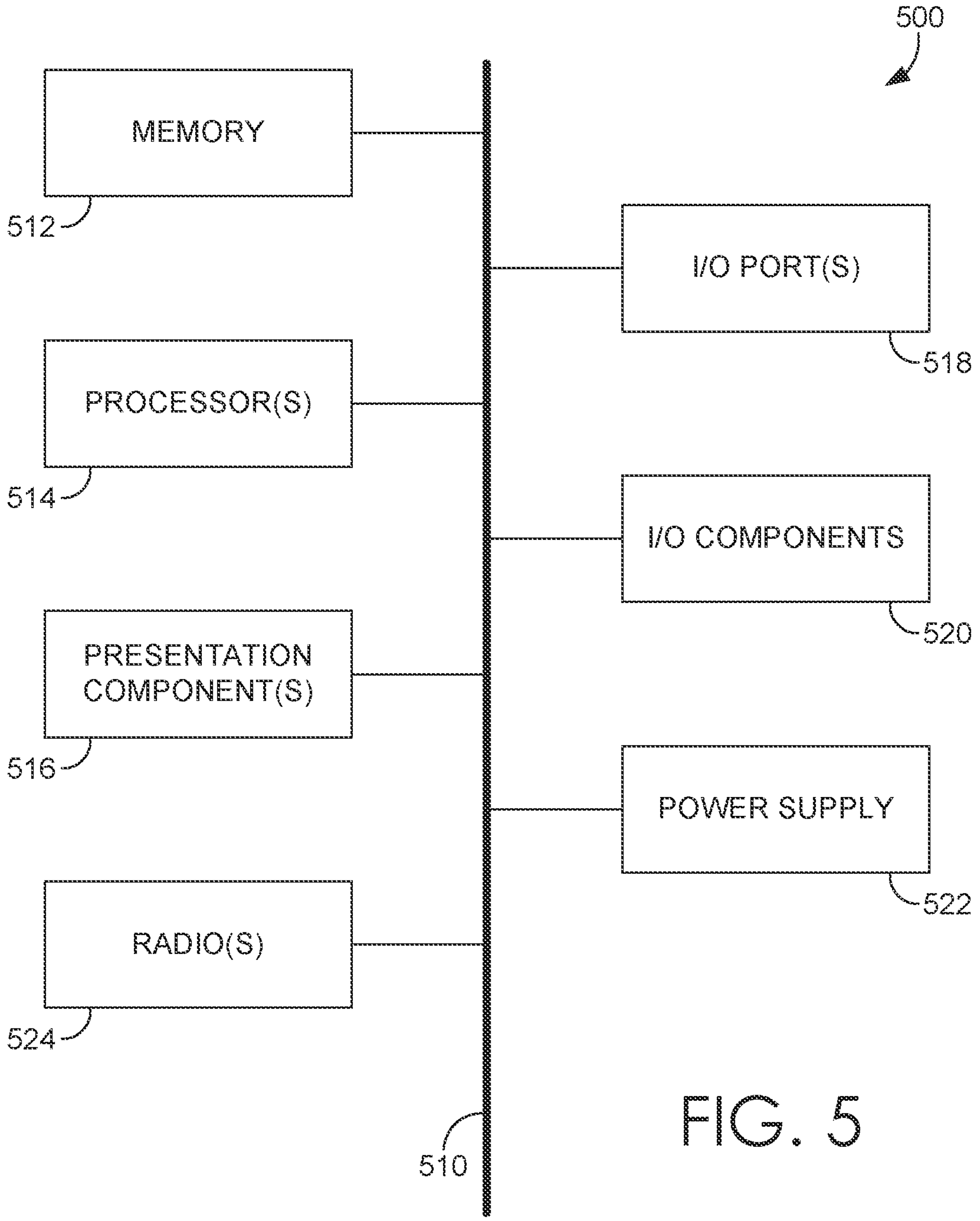
FIG. 5 depicts an exemplary computing device suitable for use in implementations of aspects herein.

A network cell may comprise a base station to facilitate wireless communication between a communications device within the network cell, such as communications device 500 described with respect to FIG. 5, and a network. As shown in FIG. 1, communications devices may be parent device 102 (e.g., a computing device), safety device 104 (e.g., a sign), user device 106 (e.g., a wearable device), or connected vehicle 108. In the network environment 100, parent device 102, safety device 104, user device 106, or connected vehicle 108 may communicate with other devices, such as mobile devices, servers, etc. Parent device 102, safety device 104, and user device 106 may take on a variety of forms, such as a personal computer, a laptop computer, a tablet, a netbook, a mobile phone, a Smart phone, a Smart watch, a sign, a personal digital assistant, or any other device capable of communicating with other devices. For example, parent device 102, safety device 104, and user device 106 may take on any form such as, for example, a mobile device or any other computing device capable of wirelessly communication with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, parent device 102, safety device 104, and user device 106 comprise a wireless or mobile device with which a wireless telecommunication network(s) can be utilized for communication (e.g., voice and/or data communication). In this regard, parent device 102, safety device 104, and user device 106 can be any mobile computing device that communicates by way of, for example, a 5G network.

In some cases, parent device 102, safety device 104, user device 106, connected vehicle 108, and/or children at play engine 114 in network environment 100 can utilize one or more communication channels to communicate with other computing devices (e.g., a mobile device(s), a server(s), a personal computer(s), etc.) through base station 112. The network environment 100 may be comprised of a telecommunications network(s), or a portion thereof. A telecommunications network might include an array of devices or components (e.g., one or more base stations), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network environment 100 can include multiple networks, as well as being a network of networks, but is shown in more simple form so as to not obscure other aspects of the present disclosure. In some aspects, the safety device 104 and the user device 106 establish a Bluetooth connection 116.

The one or more communication channels can be part of a telecommunication network that connects subscribers to their immediate telecommunications service provider (i.e., home network carrier). In some instances, the one or more communication channels can be associated with a telecommunications provider that provides services (e.g., 3G network, 4G network, LTE network, 5G network, NR, and the like) to user devices, such as parent device 102, user device 106, and/or connected vehicle 108. For example, the one or more communication channels may provide voice, SMS, and/or data services to parent device 102, user device 106, and/or connected vehicle 108, or corresponding users that are registered or subscribed to utilize the services provided by the telecommunications service provider. The one or more communication channels can comprise, for example, a 1× circuit voice, a 3G network (e.g., CDMA, CDMA2000, WCDMA, GSM, UMTS), a 4G network (WiMAX, LTE, HSDPA), or a 5G network.

The network environment 100 may include a database (not shown). The database may be similar to the memory component 512 in FIG. 5 and can be any type of medium that is capable of storing information. The database can be any collection of records (e.g., user device information, safety device information, parent device information, connected vehicle information, configurable range information, speed and direction information, images and video, and the like). In one embodiment, the database includes a set of embodied computer-executable instructions that, when executed, facilitate various aspects disclosed herein. These embodied instructions will variously be referred to as "instructions" or an "application" for short.

As previously mentioned, parent device 102, safety device 104, user device 106, connected vehicle 108, and/or children at play engine 114 may communicate with other devices by using a base station, such as base station 112. In embodiments, base station 112 is a wireless communications station that is installed at a fixed location, such as at a radio tower, as illustrated in FIG. 1. The radio tower may be a tall structure designed to support one or more antennas for telecommunications and/or broadcasting. In other embodiments, base station 112 is a mobile base station. The base station 112 may be an MMU and include gNodeB for mMIMO/5G communications via network 110. In this way, the base station 112 can facilitate wireless communication between parent device 102, safety device 104, user device 106, connected vehicle 108, and/or children at play engine 114.

As stated, the base station 112 may include a radio (not shown) or a remote radio head (RRH) that generally communicates with one or more antennas associated with the base station 112. In this regard, the radio is used to transmit signals or data to an antenna associated with the base station 112 and receive signals or data from the antenna. Communications between the radio and the antenna can occur using any number of physical paths. A physical path, as used herein, refers to a path used for transmitting signals or data. As such, a physical path may be referred to as a radio frequency (RF) path, a coaxial cable path, cable path, or the like.

The antenna is used for telecommunications. Generally, the antenna may be an electrical device that converts electric power into radio waves and converts radio waves into electric power. The antenna is typically positioned at or near the top of the radio tower as illustrated in FIG. 1. Such an installation location, however, is not intended to limit the scope of embodiments of the present invention. The radio associated with the base station 112 may include at least one transceiver configured to receive and transmit signals or data.

Continuing, the network environment 100 may further include a children at play engine 114. The children at play engine 114 may be configured to, among other things, provide a children at play live indicator, in accordance with the present disclosure. Though children at play engine 114 is illustrated as a standalone device (e.g., a server having one or more processors) in FIG. 1, it may be a component of base station 112, a component of the safety device 104, a service provided via the network, may be remotely located, and/or a combination thereof.

Figure 2:
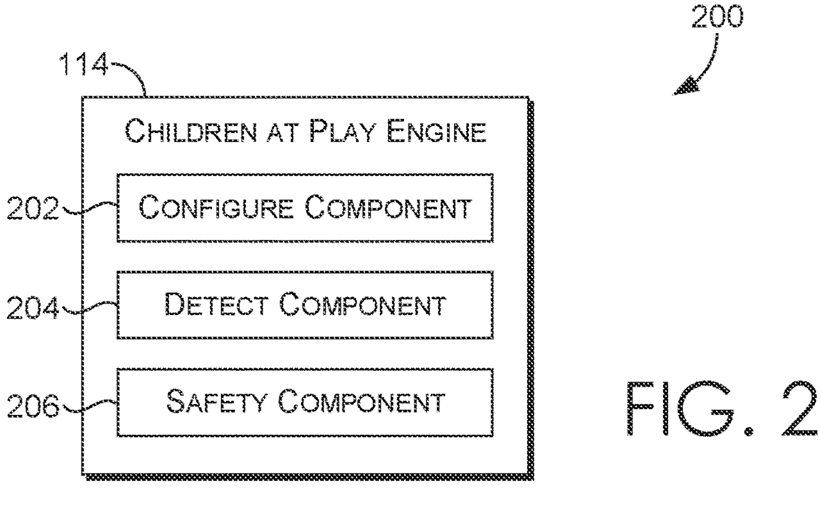
FIG. 2 depicts a diagram of a children at play engine, in accordance with aspects herein.

Referring now to FIG. 2, the children at play engine 114 may include, among other things, configure component 202, detect component 204, and safety component 206. The children at play engine 114 may communicate data to or receive data from computing devices, such as parent device 102, safety device 104, user device 106, and/or connected vehicle 108. For example, children at play engine 114 may receive configuration of a configurable range from a parent device 102, pairing information between a safety device 104 and user device 106 from the safety device 104 or the user device 106, and provide an indication that a user device is within a configurable range of a safety device to parent device 102, safety device 104, user device 106, and/or connected vehicle 108.

Configure component 202 generally enables a user device corresponding to a user to be registered with a safety device and stores information corresponding to the safety device and the user device. Additionally, configure component 202 enables a parent, via a parent device, to configure a configurable range for the user device and the safety device. In some aspects, configure component 202 communicates the configurable range for the user device and the safety device to the safety device.

Detect component 204 generally detects when the user device is within the configurable range of the safety device. Additionally, the detect component 204 may detect the speed of approaching vehicles. If the speed of an approaching vehicle exceeds a threshold, the detect component 204 may capture an image or video of the vehicle.

Safety component 206 generally, based on the user device being within the configurable range of the safety device, emits a visual or audible indicator. In some aspects, safety component 206 communicates a warning indicating the user device is within the configurable range of the safety device to a parent device. In some aspects, safety component 206 communicates a warning to a user device that the user device is within the configurable range of the safety device. In some aspects, safety component 206 communicates a warning that the safety device is emitting a visual or audible indicator at the safety device to a connected vehicle (such as one approaching the safety device). Additionally, safety component 206 may communicate a list of safety devices registered at the children at play service to the connected vehicle.

Figure 3:
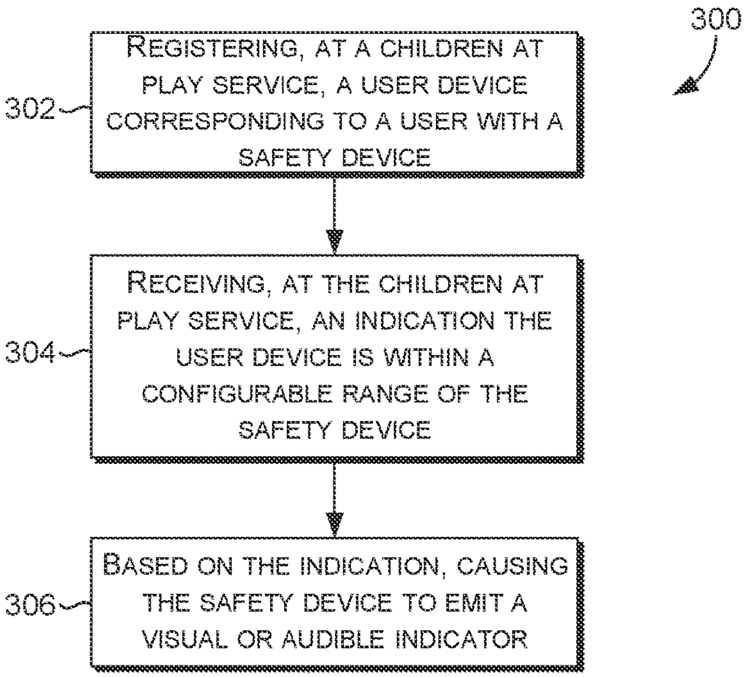
FIG. 3 depicts a flowchart of a method for providing a children at play live indicator, in accordance with aspects herein.

Turning now to FIG. 3, a flow diagram depicting an exemplary method 300 for providing a children at play live indicator is provided, in accordance with aspects of the present invention. Method 300 may be performed by any computing device (such as computing device described with respect to FIG. 5) with access to a children at play engine (such as the one described with respect to FIG. 2) or by one or more components of the network environment described with respect to FIG. 1 (such as parent device 102, safety device 104, user device 106, connected vehicle 108, and/or children at play engine 114).

Initially, at step 302, a user device corresponding to a user is registered, at a children at play service, with a safety device. By registering with the safety device, the user device is paired or able to communicate with the safety device. This enables the safety device to recognize when the user device is within a configurable range of the safety device.

At step 304, an indication the user device is within a configurable range of the safety device is received. In some aspects, a configuration of the configurable range from a parent device is received at the children at play service. For example, the parent of the child associated with the user device may wish to cause the safety device to emit a visual or audible indicator when the child (i.e., the user device) is within a certain range of the safety device (e.g., 5 feet, 10 feet, 15 feet, 20 feet, etc.).

Based on the user device being within the configurable range of the safety device, the safety device is caused, at step 306, to emit a visual or audible indicator. In some aspects, a warning indicating the user device is within the configurable range of the safety device is communicated to the user device. In some aspects, a warning indicating the user device is within the configurable range of the safety device is communicated to a parent device. In some aspects, a warning indicating the safety device is emitting a visual or audible indicator at the safety device is communicated to a connected vehicle. A list of safety devices registered at the children at play service may be communicated to the connected vehicle enabling the navigation system and/or the driver of the connected vehicle to have advance warning when a safety device (and potentially children) are in the area.

Figure 4:
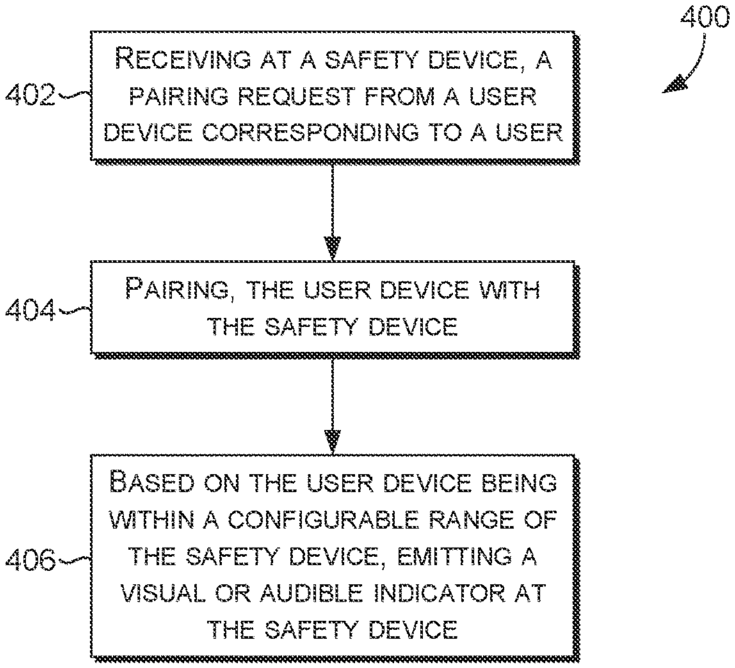
FIG. 4 depicts a flowchart of a method for providing a children at play live indicator, in accordance with aspects herein.

In FIG. 4, a flow diagram depicting an exemplary method 400 for providing a children at play live indicator is provided, in accordance with aspects of the present invention. Method 400 may be performed by any computing device (such as computing device described with respect to FIG. 5) with access to a children at play engine (such as the one described with respect to FIG. 2) or by one or more components of the network environment described with respect to FIG. 1 (such as parent device 102, safety device 104, user device 106, connected vehicle 108, and/or children at play engine 114).

Initially, at step 402, a pairing request from a user device corresponding to a user is received at a safety device. Accordingly, the user device is paired with the safety device, at step 404. This enables the safety device to recognize when the user device is within a configurable range of the safety device. In some aspects, the configurable range is received from a children at play service that stores information corresponding to the safety device and the user device and enables a parent, via a parent device, to configure the configurable range for the user device and a safety device.

At step 406, based on the user device being within a configurable range of the safety device, a visual or audible indicator is emitted at the safety device. In some aspects, a warning indicating the user device is within the configurable range of the safety device is communicated to the user device. In some aspects, a warning indicating the safety device is emitting the visual or audible indicator at the safety device is communicated to a connected vehicle. In some aspects, a warning indicating the user device is within the configurable range of the safety device is communicated to a parent device.

In some aspects, a speed corresponding to a vehicle is detected at the safety device. Based on the detecting, a warning indicating the vehicle is approaching may be communicated to the user device. Moreover, based on the speed corresponding to the vehicle exceeding a configurable limit, the safety device may capture an image or video of the vehicle.

Referring to FIG. 5, a block diagram of an example of a computing device 500 suitable for use in implementations of the technology described herein is provided. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated. In aspects, the computing device 500 may be a base station. In another embodiment, the computing device 500 may be UE capable of two-way wireless communications with an access point. Some non-limiting examples of the computing device 500 include a base station, a controller at a base station, a backhaul server, a personal computer, a cell phone, current UE, legacy UE, a tablet, a pager, a personal electronic device, a wearable electronic device, an activity tracker, a laptop, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 5, computing device 500 includes a bus 502 that directly or indirectly couples various components together. The bus 502 may directly or indirectly one or more of memory 504, processor(s) 506, presentation component(s) 508 (if applicable), radio(s) 510, input/output (I/O) port(s) 512, input/output (I/O) component(s) 514, power supply 516, and/or transmitter(s) 518. Although the components of FIG. 5 are shown with lines for the sake of clarity, in reality, delineating various components is not so clear, and metaphorically, the lines would more accurately be grey and fuzzy. For example, one may consider a presentation component(s) 508 such as a display device to be one of I/O components 514. Also, the processor(s) 506 may include memory 504, in another example. The present disclosure hereof recognizes that such is the nature of the art, and reiterates that FIG. 5 is merely illustrative of an example of a computing device 500 that can be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 504 may take the form of memory components described herein. Thus, further elaboration will not be provided here, but it should be noted that memory 504 may include any type of tangible medium that is capable of storing information, such as a database or data store. A database or data store may be any collection of records, files, or information encoded as electronic data and stored in memory 504, for example. In one embodiment, memory 504 may include a set of embodied computer-readable and executable instructions that, when executed, facilitate various functions or elements disclosed herein. These embodied instructions will variously be referred to as "instructions" or an "application" for short.

Processor(s) 506 may be multiple processors that receive instructions and process them accordingly. Presentation component(s) 508, if available, may include a display device, an audio device such as a speaker, and/or other components that may present information through visual (e.g., a display, a screen, a lamp (LED), a graphical user interface (GUI), and/or even lighted keyboards), auditory, and/or other tactile or sensory cues.

Radio(s) 510 represents one or more radios that facilitate communication with a wireless telecommunications network. For example, radio(s) 510 may be connected to one or more antenna elements through a physical path. Illustrative wireless telecommunications technologies include CDMA, GPRS, TDMA, GSM, and the like. Radio(s) 510 might additionally or alternatively facilitate other types of wireless communications including Wi-Fi, WiMAX, 4G, 3G, 4G, LTE, mMIMO, 5G, NR, VOLTE, and/or other VOIP communications. As can be appreciated, in various embodiments, radio(s) 510 can be configured to concurrently support multiple technologies, as previously discussed herein. As such, each of many radio(s) 510 may be used to separately control portions of an antenna array, for example, where at least one portion utilizes a distinct technology relative to another portion in the same antenna array or at the same base station or cell site. A wireless telecommunications network might include an array of devices, which are not shown so as to not obscure more relevant aspects of the invention. Components such as a base station, a communications tower, or even access points (as well as other components) can provide wireless connectivity in some embodiments.

The input/output (I/O) ports 512 may take a variety of forms. Exemplary I/O ports 512 may include a USB jack, a stereo jack, an infrared port, a firewire port, other proprietary communications ports, and the like. Input/output (I/O) components 514 may comprise keyboards, microphones, speakers, touchscreens, and/or any other item usable to directly or indirectly input data into the computing device 500.

Power supply 516 may include batteries, fuel cells, and/or any other component that may act as a power source to supply power to the computing device 500 or to other network components, including through one or more electrical connections or couplings. Power supply 516 may be configured to selectively supply power to different components independently and/or concurrently.

Finally, regarding FIGS. 1 through 5, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of devices and/or components.

It is noted that aspects of the present invention are described herein with reference to block diagrams and flowchart illustrations. However, it should be understood that each block of the block diagrams and/or flowchart illustrations can be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code can be performed sequentially such that one instruction is retrieved, loaded, and executed at a time. In some embodiments, retrieval, loading, and/or execution can be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A non-transitory computer-readable storage media having computer-executable instructions embodied thereon that, when executed by one or more processors, cause the processors to:

registering, by a parent device, a child device with a safety sign at a children at play service;

receiving, at the child at play service, from the parent device, an indication that the child device is within a configurable range of a safety sign;

enabling the safety sign to recognize when the child device is within a configurable range of the safety sign;

detecting, by a detect component incorporated into the safety sign, that the child device is located within the configurable range; and based on the child device being within the configurable range of the safety sign, causing, by a safety component incorporated in the safety sign, the safety sign to emit a visual or audible indicator.

2. The media of claim 1, further comprising communicating, to the child device, a warning indicating the child device is within the configurable range of the safety sign.

3. The media of claim 1, further comprising communicating, to the parent device, a warning indicating the child device is within the configurable range of the safety sign.

4. The media of claim 1, further comprising communicating, to a connected vehicle, a warning indicating the safety sign is emitting a visual or audible indicator at the safety sign.

5. The media of claim 1, further comprising communicating, to a connected vehicle, a list of safety signs registered at the children at play service.

6. A system for providing a children at play live indicator, the system comprising:

a child device wearable by a child;

a safety sign configured to emit a visual or audible indicator; and a child at play server comprising:

a configuring component configured to enable the child device registering with the child at play server and enabling the safety sign to recognize when the child device is within a configurable range of the safety sign;

a detecting component configured to determine when the child device is within a configurable range; and a safety component is configured to activate the visual or audible indicator, wherein the children at play server configured to receive a confirmation from a parent device specifying the configurable range between the child device and the safety sign;

wherein the safety sign emits a visual or audible indicator when the detect component determines that the child device is within the configurable range.

7. The system of claim 6, wherein the children at play service communicates, to the safety sign, the configurable range for the child device and the safety sign.

8. The system of claim 6, wherein the children at play service communicates, to the parent device, a warning indicating the child device is within the configurable range of the safety sign.

9. The system of claim 6, wherein the children at play service communicates, to a connected vehicle, a warning that the safety sign is emitting a visual or audible indicator at the safety sign.

10. The system of claim 6, wherein the children at play service communicates, to a connected vehicle, a list of safety signs registered at the children at play service.

11. The system of claim 6, wherein the safety sign communicates, to the child device, a warning that the child device is within the configurable range of the safety sign.

* * * * *